United States Patent [19]

Koff

[11] 4,045,383
[45] Aug. 30, 1977

[54] STABLE EMULSIONS AND IMPROVED TEMPERATURE MONITORING FILMS PREPARED THEREFROM

[75] Inventor: Arnold Koff, West Orange, N.J.

[73] Assignee: Hoffmann-La Roche Inc., Nutley, N.J.

[21] Appl. No.: 651,010

[22] Filed: Jan. 21, 1976

Related U.S. Application Data

[63] Continuation of Ser. No. 221,408, Jan. 27, 1972, abandoned, which is a continuation-in-part of Ser. No. 885,353, Dec. 15, 1969, abandoned.

[51] Int. Cl.² ............................................. C09K 3/34
[52] U.S. Cl. .................................. 260/8; 23/230 LC;
106/135; 252/299
[58] Field of Search .................. 106/135; 252/299;
260/8; 428/1; 23/230 LC

[56] References Cited

FOREIGN PATENT DOCUMENTS 1,138,590  1/1969  United Kingdom

OTHER PUBLICATIONS

Chem. Abstract 48:225 h.
Chem. Abstract 64:17,361 g.

*Primary Examiner*—Theodore Morris
*Attorney, Agent, or Firm*—Samuel L. Welt; Bernard S. Leon; William M. Farley

[57] ABSTRACT

Improved temperature monitoring films formed from stable emulsions containing compounds capable of existing in the cholesteric liquid crystalline phase which are protected and stabilized against aging, and the atmosphere by the inclusion of an antioxidant are provided. The thus-formed film materials are used in thermography and/or thermometry.

3 Claims, No Drawings

4,045,383

STABLE EMULSIONS AND IMPROVED TEMPERATURE MONITORING FILMS PREPARED THEREFROM

RELATED APPLICATION

This is a continuation, of application Ser. No. 221,408 filed Jan. 27, 1972, now abandoned which is a continuation-in-part of U.S. Pat. application Ser. No. 885,353, filed Dec. 15, 1969, now abandoned, the benefit of the date of which is hereby claimed.

BACKGROUND OF THE INVENTION

Liquid crystalline materials have properties that are intermediate those of a true liquid and a true crystal since they have an ordered structure while also having fluidity. These materials are known and are characterized or identified by one of three phases or structures known as the smectic phase, the nematic phase, and the cholestric phase (a special form of the nematic phase). The present invention is concerned with materials exhibiting a cholesteric liquid crystalline phase.

Compounds with the cholestric liquid crystalline structure exhibit certain characteristics which are markedly different from those having the smectic or the nematic structures. The characteristic properties of compounds with the cholesteric liquid crystalline structure may be summarized as follows: (1) they are optically negative, in contrast to the smectic and nematic structures which are optically positive; (2) the cholesteric liquid crystalline structure is optically active and shows strong optical rotatory power; (3) when illuminated with white light, the most striking property of the compounds with the cholesteric liquid crystalline structure is that they scatter light selectively to give vivid colors. The color and intensity of the scattered light depends upon the temperature of the scattering material and upon the degree of incidence of illumination. A cholesteric material exhibits a scattering peak having a band width of about 200 angstroms that occurs in or between the infrared and ultraviolet portions of the spectrum; (4) in the cholesteric structure, one circular polar component of the incident beam is completely unaffected. For the dextro cholesteric structure, it is only the circular polarized beam with counterclockwise rotating electric vector which is reflected. (The sign of rotation refers to an observer who looks in the direction of the incident light.) Levo cholesteric structures have the reverse effect; (5) when circular polarized light is scattered from these materials, the sense of polarization is unchanged. In ordinary materials, the sense of circular polarization is reversed; (6) the mean wave length of the reflected band depends upon the angle of incidence of the beam. The relationship can be roughly approximated by the Bragg difraction equation for birefringent materials. These enumerated properties effectively define cholesteric liquid crystals.

Thin films of cholesteric liquid crystals exhibit a property upon interaction with light, which may be termed "selective scattering". The term "scattering" is used rather than "reflection" in order to distinguish from the effect occurring on mirror surfaces wherein light is reflected at an angle equal to the angle of incident light. A scattered light ray may leave the scattering material at an angle unrelated to the angle of the incident light. A selectively scattering film, when observed with light impinging the film on the same side as that which is viewed, has an apparent color which is a complement of the color of the light transmitted through the film.

The terms "light" and "color" as used herein have a broad connotation of referring to electromagnetic radiation generally, rather than to solely visible radiation.

The phenomenon of selective scattering as exhibited by cholesteric liquid crystalline films is independent of whether the light illuminating the film is polarized or not. The color and intensity of the scattered light depends upon the temperature of the scattering material and upon the angle of incidence of illumination.

Because of the thermochromic properties of cholesteric liquid crystals, films containing them are useful for detecting temperature patterns on various objects, i.e., thermography and/or themometry. This temperature pattern is manifested by an irredescent color pattern exhibited by compounds in their cholesteric liquid crystalline phase.

Compounds capable of existing in the cholesteric liquid crystalline phase exhibit thermochromic properties at temperature ranges which are unique for that compound. Therefore, the particular cholesteric liquid crystalline compound or mixtures of compounds utilized to detect a temperature pattern can be varied to result in color sensitivity at the particular temperature range being measured. At the lower temperature within the range, which can be varied from fractions of a degree to several degrees of temperature, the color exhibited is in the red end of the spectrum and at the higher temperature within the range, the color is in the violet end of the spectrum. Intermediate temperatures result in intermediate colors, e.g., green. Thus, for example, if it is desired to measure and detect the temperature pattern of a particular portion of the anatomy of a person suspected of having a blood circulatory disorder or a tumor, a composition which shows a color change at the appropriate temperature can be formulated. Furthermore, cholesteric liquid crystals have been utilized to determine faults of metal parts of machines and airplanes by non-destructive testing techniques.

Previously, it has been found that in order to more easily visualize the colors exhibited by cholesteric liquid crystals, it is advantageous to utilize a black background. However, the use of a black background gives rise to problems which make the use of cholesteric liquid crystals for detecting temperature patterns difficult and uneconomical. One problem is that the black background must be painted on in the form of a paint or a spray and then the liquid crystals must be applied to the black background so the colors can be readily observed. Because of the problems involved, the adaptability of these systems is limited. Further, these methods are disadvantageous since the oily cholesteric liquid crystals must be applied to the black background as a solution in a volatile solvent, thus causing obvious dangers. Furthermore, the removal of the background and particularly the liquid crystals themselves is difficult particularly where large areas are concerned. These methods are also disadvantageous since it is very difficult if not impossible to get a uniformly even coating of the liquid crystals upon the background, thus rendering the pattern unreliable. Furthermore, by the known methods, the re-use of the liquid crystals is, for practical purposes, impossible.

In instances wherein the black background is painted or sprayed on a plastic film prior to the application of liquid crystals, as well as wherein no plastic film is utilized, problems arise since the liquid crystals age and are unstable when exposed to the atmosphere causing partial decomposition of the compounds and loss of color intensity and either a shift in the color-temperature response. Even in the case wherein the liquid crystals are protected from the atmosphere, e.g., minute transparent liquid walled capsules, aging and other problems arise. This is true since films formed containing these materials tend to be rough and the protected liquid crystalline material can be rubbed off, thus causing losses of color intensity and thermographic reliability. Furthermore, the thin walls of the capsules can shatter under pressure, thus exposing unprotected liquid crystals to the atmosphere.

It is more advantageous to use a film of the cholesteric liquid crystals, preferably on a flexible substrate blackened prior to the application of liquid crystals, since the utilization of a black paint or spray to serve as a background is particularly troublesome when dealing with human patients since these black paints are very difficult to apply as a uniform film, are uncomfortable on a patient and difficult to remove.

There is thus a need for a stable cholesteric liquid crystalline composition that is amenable to re-use, exhibits good color properties at desired temperature ranges, can be formed into or onto a film and is easy to apply as a uniformly thick film, is easy to remove from the thermography subject and permits the use of an easily handled black or dark background.

The problem of the prior art can be overcome to some extent by using film forming emulsions containing cholesteric liquid crystal materials. These emulsions are generally satisfactory for protecting and stabilizing the liquid crystal compositions, however, they do not prevent aging of the liquid crystals during storage.

SUMMARY OF THE INVENTION

This invention relates to stable emulsions and films formed from them which contain cholesteric liquid crystals homogeneously distributed throughout the films, processes for forming the films and the emulsions and methods for stabilizing the cholesteric liquid crystals used therein against aging by the use of antioxidants. The film-forming stable emulsions utilized in the process of this invention contain cholesteric liquid crystalline materials and an antioxidant and can be applied as a uniformly thick film to a film substrate and/or can form a self-supporting uniformly thick film. The improved emulsions containing antioxidants provide a means by which the cholesteric liquid crystals contained in them as well as the films formed from them are stabilized against aging and the effect of the atmosphere as well as mechanical abrasion.

DETAILED DESCRIPTION OF THE INVENTION

The stable emulsions used in forming the films of this invention are made from two phases, the first phase is a hydrophobic oil or organic phase, and the second phase is an aqueous phase.

The first phase contains oily cholesteric liquid crystalline materials and an antioxidant. Optionally, an oil soluble yellow dye can be included in the first phase.

The particular cholesteric liquid crystalline material or mixtures thereof as well as their proportions included in the first phase are determined by the particular temperature response required for the intended thermographic and/or thermometric use. Thus, if it is desired to have a temperature response manifested by a green color between 36° C. and 37.5° C., a homogeneous mixture of 46.0 parts of cholesteryl nonanoate, 8.0 parts cholesteryl oleyl carbonate and 6.0 parts cholesteryl chloride can be used.

The antioxidants useful in this invention are those which do not adversely affect the color-temperature response of the cholesteric liquid crystals and which also do not mask the colors. Typical suitable antioxidants are butylated hydroxytoluene (BHT), butylated hydroxy anisole (BHA), nordihydroguaiaretic acid (NDGA), 6-ethoxy-1,2-dihydro-2,2,4-trimethylquinoline (EMQ), dl-$\alpha$-tocopherol, tertiary butylhydroquinone (TBHQ), 1,5-dihydroxynaphthalene (1,5-DHN) or mixtures thereof. The amount and identity of antioxidant used can vary, however, preferably from about 0.2% to about 1.75% based on the weight of the cholesteric liquid crystals is suitable. The antioxidant has no particular affect on the abrasion resistance of the finally formed film but has the affect of stabilizing the temperature vs. color response as well as improvement in the brightness of the color developed by the films.

Optionally, an oil soluble yellow dye can be added to the first phase. The purpose of the dye is to enhance the intensity of the green color response. Usually, based on the weight of the cholesteric liquid crystals, about 0.04% to 0.06% of a yellow dye is used. A typical suitable yellow dye is Ext. D & C Yellow No. 11.

The first phase is formed by heating the cholesteric liquid crystalline material, antioxidant and remaining ingredients, if any, until a uniformly clear homogeneous liquid melt is obtained. Generally, the temperature at which this occurs depends upon the particular cholesteric liquid crystals or mixtures thereof which are used. The temperatures which are suitable for forming the melt are generally between about 40° C. and about 130° C.

It should be understood this invention comprehends the use of any cholesteric liquid crystalline material with thermochromic properties for forming the emulsions. Examples of typical cholesteric liquid crystalline materials which are suitable for use in this invention are mixed esters of cholesterol and inorganic acids, such as, cholesteryl chloride, cholesteryl bromide, cholesteryl nitrate, etc.; organic ester of cholesterol such as cholesteryl benzoate, cholesteryl crotonate, cholesteryl nonanoate, cholesteryl formate, cholesteryl acetate, cholesteryl propionate, cholesteryl valerate, cholesteryl hexanoate, cholesteryl-2-ethylhexanoate, cholesteryl octonoate, cholesteryl docosonoate, cholesteryl vaccenate, cholesteryl chloroformate, cholesteryl linolate, cholesteryl linolenate, cholesteryl oleate, cholesteryl erucate, cholesteryl butyrate, cholesteryl caprate, cholesteryl laurate, cholesteryl myristrate, cholesteryl clupanodonate, cholesteryl phenyl propionate, cholesteryl 2,4-dichlorobenzoate, etc.; ethers of cholesterol such as cholesteryl decyl ether, cholesteryl lauryl ether, cholesteryl dodecyl ether, etc.; carbonates and carbamates of cholesterol such as cholesteryl decyl carbonate, cholesteryl methyl carbonate, cholesteryl ethyl carbonate, cholesteryl butyl carbonate, cholesteryl docosonyl carbonate, cholesteryl cetyl carbonate, cholesteryl oleyl carbonate, cholesteryl p-n-butoxyphenyl carbonate, cholesteryl nonyl carbonate, cholesteryl 2-ethylhexyl carbonate, cholesteryl heptyl carbamates, etc.; alkyl amides and aliphatic secondary amines derived from 3-$\beta$-amino-$\Delta$-5-cholestene, the corresponding esters noted above of cholestanol and the like.

The second phase, i.e., the aqueous phase, is comprised of film-formers. In the preferred embodiments, the aqueous phase additionally contains a plasticizer. An added plasticizer, however, is not necessary in all cases since the cholesteric liquid crystalline materials in the first hydrophobic phase can act as plasticizers, e.g., cholesteryl oleyl carbonate. The film-formers preferably are those which exhibit surface active properties. Additional preferred optional ingredients which can be used in the aqueous phase include bacteriastatic agents which are particularly needed if the emulsion is to be stored for a length period.

Suitable types of film-formers which can be used are organic, water-soluble, film-forming polymers of plant or animal origin, typical of which are the protein-type of film formers such as zein, gelatin and hydrolyzed collagen; cellulose derivatives such as ethylcellulose, methylcellulose, hydroxy propylcellulose, hydroxy ethylcellulose, sodium carboxymethylcellulose; natural products such as acacia and starches; modified starches and polymer such as polyvinyl alcohol and polyvinyl pyrrolidone.

The preferred film-formers for use in this invention are the proteins, of which gelatin if most suitable. Of the suitable gelatins, high bloom Type A gelatin is preferred.

Since the desired use of the films formed from a particular emulsion determines the required characteristics of both the emulsion and the film eventually formed from it, the film-forming components of the aqueous phase can be varied to produce the desired results. Thus, mixtures of the aforesaid film-formers can be used in required proportions, which proportions can be ascertained by simple laboratory experiments The amount of identity of film-former utilized in the emulsions is variable but generally the total is from about 25% to about 75% by weight based on the dry weight of the finished film with about 35% to about 60% by weight preferred for most uses of the finished film.

If more than 75% of film-former by weight based on the weight of the dry film is used, then an insufficient amount of cholesteric liquid crystalline material will be in the film, resulting in poor color intensity. If less than 25% of film-former by weight is used, then there is so much cholesteric liquid crystalline material present that the resulting film becomes undesirably greasy to the feel. A greasy feel is indicative of the bleeding of cholesteric liquid crystals from the film. The presence of an excess greasy feel is, therefore, an indication of insufficient gelatin in the matrix to contain the liquid crystals homogeneously throughout the film. Hence, the film-former content in the emulsion is critical within the stated limits since an insufficient film-former content cannot prevent bleeding of the liquid crystals from the film and consequent loss of film stability and thermographic utility while an excess of film-former results in the presence of a lesser amount of liquid crystals with the consequent loss in color intensity.

The identity, amount and type of plasticizer, when used in the aqueous phase, is dependent upon the particular film properties desired. Thus, in order to obtain a flexible film, sufficient amount of a plasticizer should be used to provide on a dry weight basis about one-tenth the weight of the film-former. Howevr, in the event a cholesteric liquid crystalline material which is suitable as a plasticizer is used, no added plasticizer is needed. Generally, if a harder film is desired, no plasticizer is necessary. The amount and identity of the plasticizer will determine the flexibility of the films and this is in turn determined by the requirements of the intended use of the materials. Generally from about 0% to 7.5% by weight based on the dry film weight is suitable with about 4% preferred.

Suitable plasticizers for use in this invention are carbohydrates and polyhydric alcohols. Suitable typical carbohydrates are sugars such as sucrose, dextrose, levulose, invert sugars and sorbitol. Suitable typical polyhydric alcohols are glycols, glycerine and the like. The preferred plasticizer, when one is used in the composition of this invention, is glycerine.

Preferably, the relative proportions by weight of the cholesteric liquid crystal containing phase to the aqueous film-forming phase in the emulsion composition is about 35% to about 60% by weight of cholesteric liquid crystals to about 40% to about 65% of film-formers based on the dry weight of the finished film. These proportions can vary so long as they are within ranges which form stable emulsions and films. Generally, the most preferred emulsions contain about 50% by weight of cholesteric liquid crystals based on the dry weight of the film. The relative proportions of the film-formers and the liquid crystals in the emulsion are calculated on a dry weight basis and these proportions depend upon the end use of the composition and the methods of applying them to substrates. The relative proportions are calculated on a dry weight basis since dilution of the two phases can be made to suit convenience. The emulsion is formed by mixing to homogeniety, the aqueous solution with a homogeneous melt of the cholesteric liquid crystalline materials. Temperatures of about 40° C. to about 80° C. have been found suitable and convenient for mixing to homogeniety the components of the emulsion. There is thus formed an oil-in-water emulsion in which the cholesteric liquid crystal component is present as a distinct entity in the form of discrete particles. No chemical reaction or complexation occurs between the components of the emulsion.

These emulsions can be stored at 5° C. for periods in excess of 4 weeks without any emulsion breakdown or deterioration in the thermographic response of the crystals.

The particle sizes of the cholesteric liquid crystalline materials dispersed in the emulsion can vary, but in order to achieve a satisfactory film, particle sizes in the range of about 2 to about 10 microns are preferred because in this range the most intense colors are produced. If the particle size of the dispersed cholesteric liquid crystals is too small, the intensity of the color response is diminished and if the particle size of the cholesteric liquid crystals is too large, the emulsion is physically unstable and is not formable into a suitable film wherein the cholesteric liquid crystals are uniformly dispersed throughout (homogeneous).

The emulsion can be applied with uniform thickness to the surface of the thermography and/or thermometry subject and allowed to dry into a continuous film which is easily removable. Alternatively, the film can be formed on a non-adhering surface, e.g., Teflon, then removed and used by applying to the surface of the subject. The film can also be formed by applying the emulsion by coating by suitable means on a supportive matrix to which it will adhere such as paper, cellulose acetate or other plastic film base. After the emulsion dries as a film on the supportive matrix material, it can be cut into desired shapes or sizes prior to use and, if desired, it can be further water proofed by coating with a clear vinyl lacquer.

As previously indicated, the properties of the film or supportive matrix are modified by variations in the formulations in order to give them the properties required for a specific use. In any event, the film formed when the emulsion dries contains the cholesteric liquid crystalline material and the antioxidant permanently imbedded therein, dispersed uniformly throughout (homogeneous) and thus stabilized against aging, the atmosphere and physical abrasion. If the optional oil soluble yellow dye is included in the formulation, it too is dispersed uniformly throughout (homogeneous) the film. In many cases, the black background which is needed to better visualize the colors developed by the cholesteric liquid crystals in response to temperature is painted either on the supportive matrix or the thermographic subject before the emulsion is applied, preferably the supportive matrix serves as the black background. It is also suitable to coat a transparent supportive matrix on one side with the black background and the other side with the emulsion. Another alternative is to apply the emulsion to a transparent supportive matrix film and, after the emulsion is thoroughly dry, to paint the emulsion black and to view the color response through the transparent film. It is further advantageous to utilize a supportive matrix having a black pigment or dye dispersed therein.

In instances where it is necessary to adhere the liquid crystalline containing film to the thermographic subject, it is advantageous to coat the back of the film or supportive matrix with a pressure sensitive adhesive. Generally, the liquid crystal containing film formed from the emulsion is somewhat thicker than a monomolecular layer, but is uniformly thick throughout and is continuous. Films of from about 0.05 to about 0.15 mm. thick are suitable when on a supportive matrix. Films of the emulsion wherein no supportive matrix is used are suitable from about 0.1 to about 1.0 mm. thick, with about 0.2 mm. generally preferred. Unsupported films less than 0.10 mm. thick can be made but they are too fragile for practical purposes. As indicated previously, the films, whether supported on a matrix or not, can be rigid, brittle, flexible and/or elastic, depending on the intended uses.

In some cases, it is necessary to prepare the supportive matrix to receive the emulsion and insure its adherence. For example, if Saran (a vinylidene polymer plastic) is used, it must be first coated with a primary layer, generally a self-reacting vinyl acrylic polymer. Preferred are the types known as X-Link marketed by National Starch Company and described as self-reactive vinyl acrylic terpolymer latexes. Other similar solvent soluble resin materials known to the art which adhere to the supportive matrices and the gelatin film are also suitable, e.g., vinylidene chloride copolymer latex (Vynaclor 3623), vinyl acrylic copolymer latex (Resyn 78-3346) and vinyl acetate copolymer latex (Resyn 1103), all marketed by National Starch Company.

The following examples illustrate the invention and are not intended to be a limitation thereon. All temperatures are in ° C.

EXAMPLE 1

37.25 Parts by weight of cholesteryl nonanoate, 12.75 parts by weight cholesteryl oleyl carbonate, 10.0 parts by weight cholesteryl chloride, 0.50 parts by weight butylated hydroxytoluene and 0.66 parts by weight Ext. D & C Yellow No. 11 were mixed together and heated to about 120° α 125° until a clear solution is formed.

A solution containing 500.0 parts by weight of 300 Bloom Type A gelatin, 4.0 parts by weight of sorbic acid and sufficient water to form a solution weighing 4000 parts by weight are heated to 70°-75°. This is a 12.5% gelatin solution by weight.

60.66 Parts by weight of the liquid crystal containing melt is added to 400 parts by weight of the gelatin solution and homogenized with an Eppenbach Homo-Rod.

The particle size of the dispersed liquid crystal phase is in the range of 2–10 microns.

The completed emulsion can be stored in suitable containers or cast into a film and allowed to dry. It displays a temperature color response having a green mid-point at 7.5°–10.5°.

EXAMPLES 2 to 5

Following the procedures of Example 1, emulsions containing the following ingredients are formed using the same gelatin compositions and cast into films. The films have the color-temperature responses as noted.

| Ingredients | Example Nos. | | | |
| | 2 | 3 | 4 | 5 |
| | Parts by Weight | | | |
|---|---|---|---|---|
| Cholesteryl Nonanoate | 29.0 | 46.0 | 47.0 | 46.0 |
| Cholesteryl Oleyl Carbonate | 24.0 | 8.0 | 5.0 | 6.0 |
| Cholesteryl Chloride | 7.0 | 6.0 | 8.0 | 8.0 |
| BHT | 0.50 | 0.50 | 0.05 | 0.50 |
| Ext. D & C Yellow No. 11 | 0.06 | 0.02 | 0.02 | 0.02 |
| Gelatin Composition | 400 | 400 | 400 | 400 |
| Midpoint Temperature Response (Green Color) | 12.5°–14.5° | 36°–37.5° | 33°–36° | 30°–33° |

EXAMPLES 6 to 7

Following the procedures of Example 1, emulsion containing the following ingredients are formed, using the same gelatin composition and cast into films:

| Ingredients | Example Nos. | |
| | 6 | 7 |
| | Parts by Weight | |
|---|---|---|
| Cholesteryl Nonanoate | 43.98 | 33.48 |
| Cholesteryl Oleyl Carbonate | 10.02 | 20.52 |
| Cholesteryl Chloride | 6.00 | 6.00 |
| BHT | 0.50 | 0.50 |
| Gelatin Composition | 400 | 400 |
| Midpoint Temperature Response (Green Color) | 31.75 | 33.0 |

The following tables indicate the stability upon storge at various temperatures of the temperature-color response of the formulations of Examples 6 and 7 using as a control, the identical formulation without antioxidants.

Table I

| Formulation | Storage Temp. ° C. | Storage Time Months | Change in Response ° C. |
|---|---|---|---|
| Example 6 | Room Temp. | 1 | 0 |
| | | 2 | 0 |
| | | 3 | 0 |
| | | 4 | +0.25 |
| | 37° | 1 | 0 |
| | | 2 | −0.25 |
| | | 3 | −0.25 |
| | | 4 | −0.25 |
| | 45° | 1 | −0.25 |
| | | 2 | −0.25 |

Table I-continued

| Formulation | Storage Temp. °C. | Storage Time Months | Change in Response °C. |
|---|---|---|---|
| | | 3 | −0.25 |
| | | 4 | −0.25 |
| | 55° | 1 | −0.50 |
| | | 2 | −0.25 |
| | | 3 | −0.50 |
| | | 4 | −0.25 |
| Control | Room Temp. | 1 | 0 |
| | | 2 | 0 |
| | | 3 | 0 |
| | | 4 | +0.25 |
| | 37° | 1 | −0.25 |
| | | 2 | −0.75 |
| | | 3 | −0.50 |
| | | 4 | −0.75 |
| | 45° | 1 | −0.25 |
| | | 1.5 | no color response |
| | 55° | 1 | −1.25 |
| | | 1.25 | no color response |
| Example 7 | Room Temp. | 1 | 0 |
| | | 2 | 0 |
| | | 3 | 0 |
| | | 4 | 0 |
| | 37° | 1 | 0 |
| | | 2 | 0 |
| | | 3 | 0 |
| | | 4 | 0 |
| | 45° | 1 | −0.25 |
| | | 2 | −0.25 |
| | | 3 | −0.25 |
| | | 4 | −0.25 |
| | 55° | 1 | −0.5 |
| | | 2 | −0.25 |
| | | 3 | −0.25 |
| | | 4 | −0.25 |
| Control | Room Temp. | 1 | 0 |
| | | 2 | 0 |
| | | 3 | +0.25 |
| | | 4 | +0.25 |
| | 37° | 1 | −0.50 |
| | | 1.75 | no color response |
| | 45° | 0.75 | no color response |
| | 55° | 0.25 | no color response |

The following table illustrates the effect of various amounts of antioxidants using the cholesteric liquid crystal formulation of Example 7 with the only changes being in the amount and identity of antioxidant:

Table II

| Antioxidants | Amount Parts by Weight | Initial Color/ Temp. Response (Green) | Stability | Color Intensity |
|---|---|---|---|---|
| BHT | 0.24 | 34.25 | Excellent | Satisfactory |
| | 0.48 | 33.0 | Excellent | Satisfactory |
| | 0.72 | 31.25 | Excellent | Satisfactory |
| BHA | 0.24 | 33.0 | Excellent | Satisfactory |
| | 0.48 | 30.8 | Excellent | Satisfactory |
| | 0.72 | 26.0 | Excellent | Satisfactory |
| BHA & BHT | 0.24 | 34.25 | Good | Satisfactory |
| 1:1 | 0.48 | 32.25 | Good | Satisfactory |
| EMQ | 0.24 | 33.5 | Excellent | Satisfactory |
| | 0.48 | 29.75 | Excellent | Satisfactory |
| | 1.2 | 27.5 | Excellent | Satisfactory |
| Tocopherol | 0.24 | 32.0 | Good | Satisfactory |
| | 0.48 | 31.25 | Good | Satisfactory |
| | 1.2 | 27.75 | Good | Satisfactory |
| TBHQ | 0.24 | 36.0 | Good | Satisfactory |
| | 0.48 | 35.25 | Excellent | Satisfactory |
| | 1.2 | 35.0 | Excellent | Satisfactory |
| 1-5 DHN | 0.24 | 36.0 | Good | Excellent |
| | 0.48 | 35.25 | Good | Excellent |
| | 0.72 | 35.5 | Good | Excellent |
| None | — | 36.25 | Poor | Poor (After Storage Test) |

EXAMPLE 8

This example illustrates that no chemical reaction or complexation occurs when the cholesteric liquid crystals and the film-former are combined but that an oil-in-water emulsion forms in which both components exist as distinct entities.

440 Grams of cholesteryl pelargonate, 90 grams of cholesteryl oleyl carbonate, 70 grams of cholesteryl chloride, 5 grams of butylated hydroxy toluene and 0.1 grams of D & C Yellow No. 11 Dye are heated until a uniformly clear liquid forms. 4,000 Grams of a 12 ½% by weight aqueous solution of gelatin are heated to 50°-60° C. and added to the molten cholesteryl esters. The emulsion is formed by mixing to homogeneity with an Eppenbach Homo Rod.

Four 10 grams samples of the emulsion prepared as described above, containing 1.08 grams of gelatin and 1.30 grams of the cholesteric liquid crystalline material, are diluted into 100 ml. of water. To overcome viscosity and/or gelation problems and to improve the extraction efficiency the emulsions are further diluted with a 50/50 alcohol-water mixture except in Test 2. The samples are then exhaustively extracted with either petroleum ether, ethyl ether or ethyl ether and chloroform as follows:

| Test | Method of Extraction |
|---|---|
| 1 | Six 100 ml. portions of petroleum ether from 50/50 alcohol-water dilution |
| 2 | Six 100 ml. portions of ethyl ether from water dilution |
| 3 | Six 100 ml. portions of ethyl ether from 50/50 alcohol-water dilution |
| 4 | Two 100 ml. portions of ethyl ether, two 100 ml. portions of chloroform and two 100 ml. portions of ethyl ether from 50/50 alcohol-water dilution. |

For each sample, the extracts are then combined and evaporated to dryness on a steambath. In the case of the ethyl ether extracts (Tests 2 and 3), the extracts are washed with water before evaporation to remove any alcohol solubilized therein. In Test 4, the extracts are first evaporated to dryness on the steambath. The residue is then redissolved in chloroform and washed with water to remove any water soluble products. The resulting samples are dried in a desiccator, using calcium chloride as the desiccant for approximately 3 hours. The amount of cholesteric liquid crystalline material is then determined gravimetrically. The results are tabulated below.

| Test | % of Cholesteric Material Recovered |
|---|---|
| 1 | 97.7 |
| 2 | 99.4 |
| 3 | 99.4 |
| 4 | 99.8 |

These results show that from 97% to over 99% of the cholesteric liquid crystalline material utilized in the reaction was recovered chemically intact and, therefore, no sterol/protein reaction or complexation occurred. Hence, the emulsion compositions of this application comprise both discrete cholesteric liquid crystalline materials and discreet protein entities. The somewhat lower results in Test 1 are attributed to the fact that petroleum ether is not as efficient a solvent as ethyl ether or chloroform.

EXAMPLE 9

This example illustrates the criticality of the minimum amount of a film-former in the cholesteric liquid crystal-film-former emulsion.

20.0 Parts by weight of cholesteryl oleyl carbonate and 80 parts by weight of cholesteryl nonanoate are mixed together and heated to about 120°–125° C. until a clear solution forms.

A solution containing 500 parts by weight of 300 Bloom Type A gelatin, 4.0 parts by weight of sorbic acid and sufficient water to form a solution weighing 4000 parts by weight is heated to 70°–75° C. This is a 12.5% gelatin solution by weight.

Aliquots of the liquid crystal containing melt are added to 40 parts by weight of the 12.5% gelatin solution and homogenized with an Eppenbach Homo-Rod.

In this manner, the following emulsions are prepared, all weights are on a dry weight basis.

| Emulsion No. | Liquid Crystals grams | Gelatin grams | % Gelatin (By weight on Dry Basis) |
|---|---|---|---|
| 1 | 6.0 | 5.0 | 45.4 |
| 2 | 9.0 | 5.0 | 35.7 |
| 3 | 11.5 | 5.0 | 30.3 |
| 4 | 15.0 | 5.0 | 25.0 |
| 5 | 20.0 | 5.0 | 20.0 |

Aliquots of each of the emulsions as described are cast into films on pre-coated black Saran substrates using a Meier Rod. Each emulsion is applied three times to a Saran substrate with air drying between applications. The film coatings are then dried overnight at room temperature.

Tactile evaluation of the coated substrates is based on the greasiness or oiliness of the film as evidenced by a resistance to rubbing and greasy feel. The greater resistance to rubbing and greasiness of feel, the less satisfactory the film. The following is a tabulation of the results.

| Film, % Gelatin | Rubbing Resistance | Greasy Feel | Film Rating |
|---|---|---|---|
| 45.4 | + | + | Satisfactory |
| 35.7 | + | + | Satisfactory |
| 30.3 | + | + | Satisfactory |
| 25.0 | ± | ± | Satisfactory Borderline |
| 20.0 | − | − | Unsatisfactory |

In the preceding table the symbols have the following meanings:

+ = satisfactory characteristics, i.e., minimal rubbing resistance and minimal greasy feel.

± = Borderline characteristic — barely satisfactory, i.e., some rubbing resistance and some greasy feed.

− = unsatisfactory characteristics, i.e., substantial rubbing resistance and excess greasy feel.

A greasy feel and rubbing resistance are manifestations of the bleeding of the cholesteric liquid crystals from the film. The presence of an excess greasy feel is, therefore, an indication of insufficient gelatin in the matrix to contain the liquid crystals homogeneously throughout the film.

Therefore, the gelatin content of the liquid crystal/-gelatin emulsion is of importance since an emulsion having an insufficient gelatin content cannot prevent bleeding of the liquid crystals from the film and consequent loss of film stability and thermographic utility.

The antioxidant was not included in the emulsion formulations since it has no effect on any physical characteristics of the film including rubbing resistance and greasy feel.

I claim:

1. A device suitable for forming thermographic patterns consisting of a film having, as an integral part thereof, from about 25% to about 75% by weight on a dry weight basis of a cholesteric liquid crystal composition containing from about 0.2% to about 1.75% by weight based on the weight of the cholesteric liquid crystals of butylated hydroxytoluene and from about 75% to about 25% by weight on dry weight basis, of gelatin and wherein the cholesteric liquid crystals are homogeneously distributed throughout the film.

2. The device of claim 1 wherein said film is adhered to a supportive matrix.

3. A device as in claim 1 wherein the concentration of gelatin in the film is from about 35% to about 60% by weight on a dry weight basis.

* * * * *